United States Patent [19]

Bartels et al.

[11] Patent Number: 5,011,994

[45] Date of Patent: Apr. 30, 1991

[54] COLORLESS KETIMINES THEIR PREPARATION AND THEIR USE AS CROSS-LINKING AGENT

[75] Inventors: Tamme Bartels; Wincenty L. S. Pilaszek, both of Tholen, Netherlands

[73] Assignee: Akzo N.V., Arnhem, Netherlands

[21] Appl. No.: 35,117

[22] Filed: Apr. 2, 1987

[30] Foreign Application Priority Data

Apr. 3, 1986 [NL] Netherlands .................. 8600847

[51] Int. Cl.$^5$ ............................................ C07C 251/08
[52] U.S. Cl. ............................... 564/278; 564/248
[58] Field of Search ............................ 504/278, 248

[56] References Cited

U.S. PATENT DOCUMENTS

| | | | |
|---|---|---|---|
| 2,265,051 | 7/1941 | Adams | 564/278 |
| 3,291,775 | 12/1966 | Holm | 562/278 |
| 3,621,006 | 11/1971 | Schmeinger et al. | 564/278 |
| 3,975,251 | 8/1976 | McGinniss | 204/181 |
| 4,028,414 | 6/1977 | Clough | 564/278 |
| 4,126,640 | 11/1978 | Floyd | 564/278 |
| 4,251,597 | 2/1981 | Emmons et al. | 428/500 |
| 4,503,174 | 3/1985 | Vasta | 523/439 |
| 4,504,631 | 3/1985 | Stephen | 525/296 |

FOREIGN PATENT DOCUMENTS

| | | | |
|---|---|---|---|
| 1183345 | 3/1970 | United Kingdom | 564/278 |
| 1229840 | 4/1971 | United Kingdom | 564/278 |

Primary Examiner—James H. Reamer
Attorney, Agent, or Firm—Louis A. Morris

[57] ABSTRACT

The invention pertains to a colorless ketimine or an adduct thereof displaying excellent color stability and usable as a cross-linking agent in a curable coating, impregnating, sealing or bonding composition wherein the ketimine is the adduct of a polyamine having a primary and a secondary amino group and containing at least 3 carbon atoms in a linear chain between both amino groups, and a ketone containing not more than 8 carbon atoms and having methylene groups adjacent to the carbonyl group. The invention also pertains to a process for preparing the ketimine and to the use of the ketimine in a curable composition.

10 Claims, No Drawings

COLORLESS KETIMINES THEIR PREPARATION AND THEIR USE AS CROSS-LINKING AGENT

The invention relates to a cross-linking agent comprising a mono- or di-functional, one or more secondary amino groups-containing ketimine or the adduct thereof and a compound reactive with secondary amino groups.

Such cross-linking agents are well-known and are applied in bicomponent compositions curable under the influence of moisture and used for, for instance, coating, impregnating, sealing and bonding purposes, on the basis of resins containing functional groups such as anhydride, epoxy, isocyanate, acetoacetate and $\alpha,\beta$-ethylenically unsaturated carbonyl. The hydrolysis under the influence of moisture is attended with the release of a ketone, which can evaporate from the composition, and the formation of a primary amino group which may enter into a cross-linking reaction with the functional resins. Secondary amino groups-containing ketimines are known from, for instance, French Patent Specification No. 1 573 546 and Belgian Patent Specification No. 726 331.

It is also known that in some cases the use of these low molecular weight ketimines gives rise to problems as far as toxicity, carbonisation tendency and performance of the cured product are concerned. In those cases it is preferred that the molecular weight of the mono- or difunctional ketimine be increased by addition to the secondary amino group(s) of one or more compounds reactive with the secondary amino group. Such "oligomeric" ketimines having a medium molecular weight, usually in the range of 300 to 3000, are described in, int. al., U.S. Pat. Nos. 3,975,251, 4,251,597, 4,503,174 and 4,504,630.

The colour or at least the colour stability of the well-known cross-linking agents is generally not quite satisfactory. Often the product is found to discolour during its preparation, while in other cases the products appear to discolour during storage. This is objectionable if they are to be used in compositions for which the colour is of essential importance, as with colourless coatings in, e.g., a 2-layer metallics system.

The invention provides cross-linking agents which are colourless and moreover display excellent colour stability.

The present cross-linking agent is characterized according to the invention in that the ketimine has the formula

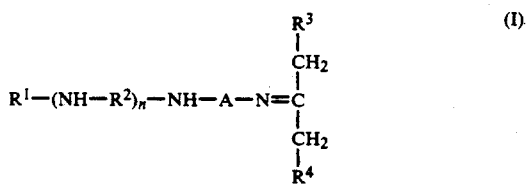

wherein
A stands for a saturated, branched or non-branched, divalent aliphatic hydrocarbon group having at most 12 carbon atoms and containing at least three carbon atoms in a linear chain between —NH— and —N=,
$R^1$=alkyl or cycloalkyl having at most 20 carbon atoms, or —A—NH$_2$, or

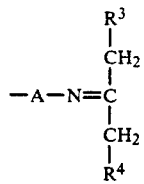

$R^2$=alkylene or cycloalkylene containing at most 12 carbon atoms,
$R^3$=alkyl containing 1–4 carbon atoms,
$R^4$=alkyl containing 1–4 carbon atoms,
n=0, 1, 2, 3
with the proviso that $R^3$ and $R^4$ together do not contain more than 5 carbon atoms. It is preferred that $R^1$ should be a methyl, lauryl, hexadecyl or cyclohexyl group. Representative examples of $R^2$ are ethylidene, propylidene, hexalidene, cyclopentalidene and cyclohexalidene or alkyl substituted derivatives thereof.

Quite surprisingly it appears that a specific choice of the ketimine results in both the ketimine itself and the preferably used "oligomeric" adducts being colourless, even after prolonged storage.

The mono- or difunctional ketimines according to the invention will be further described with reference to the amines and ketones from which they may be prepared in a known manner by a condensation reaction.

The primary and secondary amino groups-containing polyamines suitable for the ketimines according to the invention must contain a linear chain of at least 3 carbon atoms between every primary and secondary amino group. Alternatively, use may be made of a longer and/or branched alkylene chain. It is preferred that the primary and the secondary amino groups should be interlinked by a propylene radical and that in formula (I) A should stand for —CH$_2$CH$_2$CH$_2$—. As examples of suitable polyamines may be mentioned N-methyl-1,3-diaminopropane, N-ethyl-1,3-diaminopropane, N-cyclohexyl-1,3-diaminopropane, N-methyl-1,4-diaminobutane, dipropylenetriamine, bis(3-aminopropane)-1,2-dimainoethane, and N-ethyl-1,6-diaminohexane. In formula (I) the n groups $R^2$ and, if present, the two groups A may be the same or different and have the afore-mentioned meaning.

In the ketones according to the invention both $\alpha$-carbon atoms must have two hydrogen atoms attached to them. In formula (I) $R^3$ and $R^4$ stand for alkyl groups, with the proviso that $R^3$ and $R^4$ together do not contain more than 5 carbon atoms. So the ketone may contain in all 5–8 carbon atoms. It is preferred that $R^3$ should stand for methyl. As examples of suitable ketones may be mentioned pentanone-3, hexanone-3, heptanone-3, heptanone-4, octanone-3, octanone-4, 5-methylheptanone-3, 6-methylheptanone-3, 2-methylheptanone-4 and 5,5-dimethylhexanone-3. Difunctional ketimines according to formula (I) may contain two different ketimine groups.

The "oligomeric" ketimine according to the invention is an adduct of an above-described ketimine and a compound reactive with secondary amino groups. As such use may be made of any compound with the appropriate reactive functionality, provided that it contains no interfering groups and especially that it has no inherent colour. As examples of suitable compounds to form an adduct with the ketimine may be mentioned those comprising one or more epoxy, isocyanate or α, β-ethylenically unsaturated carbonyl groups.

As examples of suitable epoxy compounds that may be employed for the envisaged adduct may be mentioned the glycidyl ethers of cyclo(aliphatic) or aromatic hydroxyl compounds, such as allyl alcohol, butanol, cyclohexanol, phenol, butyl phenol, decanol, ethylene glycol, butane glycol, glycerol, cyclohexane diol, mononuclear di- or polyvalent phenols, bisphenols such as Bisphenol-A and Bisphenol-F, and polynuclear phenols; polyglycidyl ethers of phenol formaldehyde; novolak; epoxidized and optionally hydrogenated styrene or divinyl benzene; glycidyl esters of fatty acids containing, for instance, 6-24 carbon atoms; glycidyl ester of versatic acid (available under the trade mark Cardura E of Shell); glycidyl (meth)acrylate; epoxy compounds containing an isocyanurate group; an epoxidized polyalkadiene such as epoxidized polybutadiene; hydantoin epoxy resins; epoxy resins obtained by epoxidation of aliphatic and/or cycloaliphatic alkenes, such as dipentene dioxide, dicyclopentadiene dioxide and vinylcyclohexene dioxide and glycidyl groups-containing resins such as polyesters or polyurethanes which contain one or more glycidyl groups per molecule, or mixtures of the epoxy resins referred to hereinbefore. The epoxy resins are known to the man skilled in the art and need not be further described here. Particularly, use is made of a (cyclo)aliphatic epoxy compound or a polymer of ethylenically unsaturated compounds with epoxy groups such as glycidyl (meth)acrylate, N-glycidyl(meth)acrylamide and/or allylglycidyl ether, and optionally of one or more other copolymerizable ethylenically unsaturated monomers.

As examples of isocyanate compounds that may be used for the adduct referred to above may be mentioned alkyl isocyanates containing 7-21 carbon atoms or aliphatic, cycloaliphatic or aromatic polyisocyanates which may or may not be ethylenically unsaturated, such as 1,2-propylene diisocyanate, trimethylene diisocyanate, tetramethylene diisocyanate, 2,3-butylene diisocyanate, hexamethylene diisocyanate, octamethylene diisocyanate, 2,2,4-trimethylhexamethylene diisocyanate, 2,4,4-trimethylhexamethylene diisocyanate, dodecamethylene diisocyanate, ω,ω'-dipropylether diisocyanate, 1,3-cyclopentane diisocyanate, 1,2-cyclohexane diisocyanate, 1,4-cyclohexane diisocyanate, isophoron diisocyanate, 4-methyl- 1,3-diisocyanatocyclohexane, trans-vinylidene diisocyanate, dicyclohexylmethane-4,4'-diisocyanate, 3,3'-dimethyldicyclohexylmethane-4,4'-diisocyanate, a toluene diisocyanate, 1,3-bis(isocyanatomethyl)benzene, a xylylene diisocyanate, 1,5-dimethyl-2,4-bis(isocyanatomethyl)benzene, 1,5-dimethyl-2,4-bis(isocyanatomethyl)benzene, 1,5-dimethyl-2,4-bis(2-isocyanatoethyl)benzene, 4,4'-diisocyanatodiphenyl, 3,3'-dichloro-4,4'-diisocyanatodiphenyl, 3,3'-diphenyl-4,4'-diisocyanatodiphenyl, 3,3'-dimethoxy-4,4'-diisocyanatodiphenyl methane, a diisocyanatonaphthalene, the adduct of 2 molecules of a diisocyanate, for instance hexamethylene diisocyanate or isophoron diisocyanate, and a diol such as ethylene glycol, the adduct of 3 molecules of hexamethylene diisocyanate and 1 molecule of water (available under the trade mark Desmodur N of Bayer), the adduct of 1 molecule of trimethylol propane and 3 molecules of toluene diisocyanate (available under the trade mark Desmodur L of Bayer), the adduct of 1 molecule of trimethylol propane and 3 molecules of isophoron diisocyanate, compounds such as 1,3,5-triisocyanato benzene and 2,4,6-triisocyanatotoluene, and the adduct of 1 molecule of pentaerythritol and 4 molecules of toluene diisocyanate. It is preferred that use should be made of an aliphatic or cycloaliphatic di- or triisocyanate containing 8-36 carbon atoms.

The α,β-ethylenically unsaturated carbonyl compound used in the addition reaction with the ketimine is preferably a (meth)acryloyl compound; optionally use may be made of, for instance, a compound containing one or more α,β-ethylenically unsaturated dicarbonyl units, such as maleic acid or fumaric acid or a (di)ester thereof. Representative examples of (meth)acryloyl compounds include (meth)acrylic acid derivatives, more particularly the (meth)acrylic esters, of mono- or polyhydroxyl compounds, including polyester polyols and polyether polyols; adducts of on the one hand a hydroxyl group-containing (meth)acrylic ester to on the other hand an at least bifunctional isocyanate compound; and adducts of (meth)acrylic acid to an at least bifunctional epoxy compound.

Suitable (meth)acrylic esters of monohydroxyl compounds are those of, for instance, fatty alcohols.

Examples of suitable (meth)acrylic esters of di-, tri- or polyvalent hydroxyl compounds include those of ethylene glycol, propylene glycol, diethylene glycol, tetramethylene diol, neopentyl glycol, hexamethylene diol, cyclohexane diol, bis(4-hydroxycyclohexyl)methane, glycerol, trimethylol ethane, trimethylol propane and pentaerythritol. These esters may optionally contain a hydroxyl group. Such polyols and other suitable hydroxyl compounds such as polyester di- and polyols and polyether di- and polyols are described, among other places, in Lackkunstharze by H. Wagner and H. F. Sarx, 5th Ed., 1971 (Carl Hanser Verlag, Munich).

The above-mentioned adducts may be effectively prepared by an addition reaction with the ketimine of formula (I) of the compound reactive with secondary amino groups. Monofunctional ketimines are preferably subjected to an addition reaction with compounds containing more than one functional group reactive with secondary amino groups to form an adduct with polyketimine functionality. Difunctional ketimines of formula (I) may be brought into reaction with monofunctional reactive compounds. Optionally, first the reaction involving the addition to an amino group of the starting polyamines may be carried out and subsequently the remaining primary amino groups may be blocked with said ketones. The preparation of ketimines is known in itself and comprises the condensation reaction of a primary amino group with a ketone attended with water being split off and may be accelerated by the use of well-known catalysts, such as organic or inorganic acids, amine halides, acid salts or metal carboxylates.

The present novel ketimines are prepared by bringing an amine of the formula (II)

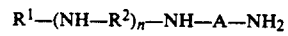

wherein A, $R^1$, $R^2$ and n may have the afore-mentioned meanings into reaction with a ketone of the formula (III)

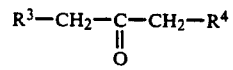

wherein $R^3$ and $R^4$ may have the afore-mentioned meanings, optionally in the presence of a catalyst. A preferred catalyst is zinc acetate, which leads to a product with a better smell than that of the product obtained with the use of an acid catalyst.

The present cross-linking agents may be employed in the usual amounts in all curable coating, impregnating, sealing and bonding compositions in which the well-known ketimine cross-linking agents were already used or could be used, said composition containing a functional resin having as functional groups, for instance, anhydride, epoxy, isocyanate, acetoacetate and $\alpha,\beta$-ethylenically unsaturated carbonyl groups. It is preferred that said composition should contain the present cross-linking agent in such an amount that ¼–4 equivalents of primary (ketiminized) amino groups are present per equivalent of the functional groups of the functional resin. In addition, these compositions may still contain organic solvents, usually employed in the paint industry, such as the aliphatic or aromatic hydrocarbons, esters, ethers, alcohols, ketones and ether acetates and/or the usual additives, such as pigments, fillers, levelling agents, foam suppressing agents, rheology controlling agents, catalysts such as organic carboxylic acids, anti-oxidants, UV-stabilizers, and sag-control agents. In these compositions the present cross-linking agents display curing properties similar to those of the well-known ketimines, but they are superior to them in that they have a lower Gardner colour rating, which is maintained during storage.

The invention will be further described in the following examples. In them the ketimines are rated for colour by the Gardner 1933 scale.

EXAMPLE I (a) Under a nitrogen atmosphere 1,5 moles of dipropylene triamine, 3,3 moles of pentanone-3, 113 g of toluene and 2% by weight (calculated on the amine) of zinc acetate were charged into a reaction vessel and heated to boiling point, the water evolved being removed by azeotropic distillation. After about 10 hours 53,9 g of water (99,8% of the theoretical amount) had been collected. The resulting solution was cooled to 60° C. and filtered.

(b–g) The same procedure was used for preparing the diketimines of dipropylenetriamine and respectively, heptanone-3 and 5-methylheptanone-3, the diketimines of N,N'-bis(3-aminopropyl)-1,2-diaminoethane and, respectively, 5-methylheptanone-3 and pentanone-3, the ketimine of N-methyl-1,3-diaminopropane and 5-methylheptanone-3 and the ketimine of N-cyclohexyl-1,3-diaminopropane and octanone-3.

Immediately upon their being prepared the ketimines according to the invention were rated for colour by the Gardner scale. Samples (100 ml) of each of the ketimines were stored in closed vessels for 6 weeks at 50° C., after which they were again rated for colour. The results are summarized in Table I.

EXAMPLE II (COMPARISON)

The procedure of Example Ia was repeated for preparing the ketimines mentioned in Table II that fall outside the scope of the present invention. The colour was determined both immediately after preparation and after storage for 6 weeks at 50° C. The Examples II a–c show that in combination with the same ketones as used in Example I polyamines with an ethylene bridge between the primary and secondary amino groups lead to coloured ketimines with limited colour stability.

EXAMPLE III (COMPARISON)

The procedure of Example Ia was repeated for preparing the ketimines mentioned in Table II that fall outside the scope of the present invention and their colour was determined. The Examples III a–h show that the ketones which do not correspond to Formula III lead to coloured and colour-unstable ketimines.

EXAMPLE IV (a) To 708,4 g of the diketimine prepared in accordance with Example Ia was added a solution in 162,0 g of toluene of 378 g of a diglycidyl ether of Bisphenol A (available under the trade mark Epikote 828 of Shell Chemical) over a period of 2 hours at 80° C. This reaction mixture was kept at a temperature of 100° C. for 3 hours. Subsequently, 272,5 g of n-butanol were added and the mixture was cooled and stored. Both initially and after 6 weeks' storage at 50° C. the colour of the endproduct was <1 by the Gardner scale.

(b) To 930,5 g of the diketimine prepared in accordance with Example Ic were added 282 g of butane diol-1,4-glycidyl ether (available under the trade mark Grilonit RV 1806 of EMS-Chemie AG). This reaction mixture was kept at 100° C. for 3 hours. Subsequently, 193,3 g of n-butanol were added and the mixture was cooled and stored. Both initially and after 6 weeks' storage at 50° C. the colour of the endproduct was <1 by the Gardner scale.

(c) To 275,4 g of the diketimine prepared in accordance with Example Ia was added over a period of 3 hours a stoichiometric amount of an epoxy groups-containing resin in the form of a 60 wt. % solution in a mixture of equal weight parts of xylene and n-butanol. The epoxy groups-containing resin with a number average molecular weight of 3000 was built up from glycidyl methacrylate, styrene and butyl acrylate in a weight ratio of 15:59,8:25,2. The mixture was subsequently heated for 2 hours to 80° C., after which it was successively cooled, filtered and stored. Both initially and after 6 weeks' storage the colour of the endproduct was <1 by the Gardner scale.

(d) In a reactor 444 g of isophoron diisocyanate and 0,2 g of dibutyltin dilaurate were heated to a temperature of 40° C., after which a solution of 118,0 g of hexane-diol-1,6 in 177,0 g of toluene was added over a period of 2 hours. After 1 hour a product was obtained having an isocyanate content of 11,5% by weight. Subsequently, 930,5 g of the ketimine prepared in Example Ic were added for 1 more hour at a temperature of 60°–80° C. and the reaction mixture was kept at 80° C. for 1 hour until all the isocyanate groups had been brought into reaction. Added were 167,2 g of toluene. After cooling and filtration the colour of the endproduct was <1 by the Gardner scale. After 6 weeks' storage at 50° C. the colour had not changed.

(e) Into a reactor filled with 444 g of isophoron diisocyanate and 0,2 g of dibutyltin dilaurate was charged over a period of 2 hours at 40° C. a solution in 300 g of butyl acetate of 200 g of polyethylene glycol (MW=200). After 1 hour the product had an isocyanate content of 8,9% by weight. Subsequently, 708,4 g of the diketimine prepared in Example Ia were added over a period of 90 min. at 60°–80° C. Upon continued heating for 1 hour the isocyanate content of the mixture decreased to zero, after which 77,9 g of butyl acetate were added. Both initially and after 6 weeks' storage at 50° C. the colour of the cooled and filtered product was <1 by the Gardner scale.

(f) To 1114 g of a diketimine prepared in accordance with Example 1d were added over a period of 1 hour 1018 g of lauryl methacrylate under an atmosphere of nitrogen and at 80° C. This reaction mixture was kept at a temperature of 100° C. for 3 hours. Subsequently, 880 g of xylene were added and the resulting mixture was cooled and stored. Both initially and after 6 weeks' storage at 50° C. the colour of the endproduct was <1 by the Gardner scale.

(g) To 1230 g of a diketimine prepared in accordance with Example 1c in 104 g of n-butanol were added for 1 hour 260 g of hexane diol diacrylate under an atmosphere of nitrogen and at 80° C., to which mixture 60 g of n-butanol were added, after which the reaction mixture was kept at 100° C. for 90 minutes. Next, the mixture was diluted to a solids content of 60% by weight, cooled and stored. Both initially and after 6 weeks' storage at 50° C. the colour of the endproduct was <1 by the Gardner scale.

(h) To 548,8 g of a diketimine prepared in accordance with Example 1c there were added for 1 hour 254 g of lauryl methacrylate under a nitrogen atmosphere and at 80° C. This reaction mixture was kept at 100° C. for 90 minutes. To it were added 542 g of n-butanol and the resulting mixture was cooled and stored. Both initially and after 6 weeks' storage at 50° C. the colour of the endproduct was <1 by the Gardner scale.

(i) Under a nitrogen atmosphere 2 moles of dipropylene triamine, 4,8 moles of 5-methylheptanone-3, 292 g of xylene and 1% by weight of zinc acetate (based on the amine) were introduced into a reaction vessel and heated to boiling point, the reaction water evolved being removed by azeotropic distillation. After about 6 hours 99% of the theoretical amount of water had been collected. The resulting solution was cooled to 140° C. and subsequently 2,6 g of di-butyltindilaurate were added. To this solution were added for 1 hour at 140° C. 2 moles of ε-caprolactone and subsequently 50 g of xylene, after which the resulting mixture was kept at 140° C. for 3 hours. Then the solution was cooled to 80° C., at which temperature 1 mole of hexamethylene diisocyanate was added over a period of 60–90 minutes and subsequently 50 g of xylene were added and the resulting mixture was kept at 80° C. until the NCO content had decreased to zero. Thereupon 849 g of n-butanol were added. Both initially and after 6 weeks' storage at 50° C. the cooled and filtered product had a colour <1 by the Gardner scale.

EXAMPLE V

Example of using a ketimine according to the invention in a non-pigmented, colourless coating composition.

A stoichiometric amount of the oligomeric ketimine according to Example IVd was mixed with an acryloyl groups-containing resin. This resin had been prepared by reacting a stoichiometric amount of acrylic acid with an epoxy groups-containing resin having a number average molecular weight of 3500 and built up from glycidyl methacrylate, styrene and butyl acrylate in a weight ratio of 25:61,5:13,5, in the form of a 50 wt. % solution in xylene.

After this composition had been applied to a steel panel in a coating thickness of 40 μm (measured after drying), the resulting coating was dried for 1 week at 21° C.

The properties were found to be as follows:
pot stability: 4 hours,
tack-free time: 30 minutes,
dry-hard time: 2 hours,
Persoz hardness: 194 seconds,
resistance to petrol: excellent.

Use of the ketimines according to Example I and Example IV a–c+e–i instead of the ketimine according to Example IVd in the composition referred to hereinbefore gave similar results.

TABLE I

Ketimines of formula $$R^1-(NH-R^2)_n-NH-A-N=C-CH_2-R^3$$
$$\phantom{R^1-(NH-R^2)_n-NH-A-N=C-}|$$
$$\phantom{R^1-(NH-R^2)_n-NH-A-N=}CH_2-R^4$$

| Ex. | A | $R^1$ | $R^2$ | $R^3$ | $R^4$ | n | Gardner colour after preparation | Gardner colour after storage |
|---|---|---|---|---|---|---|---|---|
| Ia | —CH$_2$CH$_2$CH$_2$— | —A—N=C(—CH$_2$—R$^3$)(—CH$_2$—R$^4$) | — | methyl | methyl | 0 | <1 | <1 |
| Ib | —CH$_2$CH$_2$CH$_2$— | " | — | methyl | n-propyl | 0 | <1 | <1 |
| Ic | —CH$_2$CH$_2$CH$_2$— | " | — | methyl | sec-butyl | 0 | <1 | <1 |
| Id | —CH$_2$CH$_2$CH$_2$— | " | —CH$_2$CH$_2$— | methyl | sec-butyl | 1 | <1 | <1 |
| Ie | —CH$_2$CH$_2$CH$_2$— | " | —CH$_2$CH$_2$— | methyl | methyl | 1 | <1 | <1 |
| If | —CH$_2$CH$_2$CH$_2$— | CH$_3$ | — | methyl | sec-butyl | 0 | <1 | <1 |
| Ig | —CH$_2$CH$_2$CH$_2$— | (thiophene-S) | — | methyl | n-butyl | 0 | <1 | <1 |

TABLE II

| | Ketimines outside the invention | | Gardner colour | |
| --- | --- | --- | --- | --- |
| Ex. | starting polyamine | starting ketone | after preparation | after storage |
| IIa | diethylene triamine | 5-methylheptanone-3 | 3 | 5 |
| IIb | diethylene triamine | pentanone-3 | 4 | 6 |
| IIc | N(2-aminoethyl)-1,3-diaminopropane | 5-methylheptanone-3 | 4 | 8 |
| IIIa | dipropylene triamine | pentanone-2 | 5 | 8 |
| IIIb | dipropylene triamine | 4-methylpentanone-2 | 2 | 5 |
| IIIc | dipropylene triamine | heptanone-2 | 3 | 5 |
| IIId | dipropylene triamine | cyclohexanone | 7 | 10 |
| IIIe | dipropylene triamine | 3,3,5-trimethylcyclohexanone | 10 | 17 |
| IIIf | dipropylene triamine | 2,4-dimethylpentanone-3 | 4 | — |
| IIIg | N,N'-bis(3-aminopropyl)-1,2-diaminoethane | 4-methyl-pentanone-2 | 2 | 5 |
| IIIh | N,N'-bis(3-aminopropyl)-1,2-diaminoethane | cyclohexanone | 11 | — |

We claim:

1. A compound comprising a ketimine or an adduct of a ketimine and a compound reactive with secondary amino groups, the ketimine or the ketimine precursor of the adduct having the formula

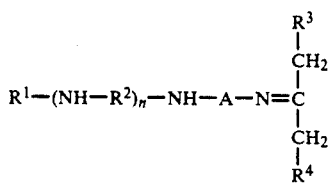 (I)

wherein

A = a saturated, branched or non-branched, divalent aliphatic hydrocarbon group having at most 12 carbon atoms and containing at least three carbon atoms in a linear chain between —NH— and —N=, $R^1$ = alkyl or cycloalkyl having at most 20 carbon atoms, or —A—NH$_2$, or

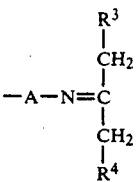

$R^2$ = alkylene or cycloalkylene containing at most 12 carbon atoms, $R^3$ = alkyl containing 1–4 carbon atoms, $R^4$ = alkyl containing 1–4 carbon atoms, n = 0, 1, 2, or 3, with the proviso that $R^3$ and $R^4$ together do not contain more than 5 carbon atoms.

2. The compound of claim 1, wherein the ketimine or adduct is a ketimine.

3. The ketimine of claim 2, wherein A = —CH$_2$CH$_2$CH$_2$—.

4. The ketimine of claim 2, wherein $R_3$ = methyl.

5. The ketimine of claim 3, wherein $R_3$ = methyl.

6. The compound of claim 1, wherein the ketimine or adduct is an adduct.

7. The adduct of claim 6, wherein the adduct is an adduct having a molecular weight of 300–3000 of the ketimine precursor of formula I and one or more mono- or polyfunctional epoxy compounds, mono- or polyfunctional isocyanate compounds, or mono- or polyfunctional α,β-ethylenically unsaturated carbonyl compounds.

8. The adduct of claim 6, wherein in the ketimine precursor, A = —CH$_2$CH$_2$CH$_2$—.

9. The adduct of claim 6, wherein in the ketimine precursor, $R_3$ = methyl.

10. The adduct of claim 8, wherein in the ketimine precursor, $R_3$ = methyl.

* * * * *